United States Patent Office 3,338,358
Patented Aug. 29, 1967

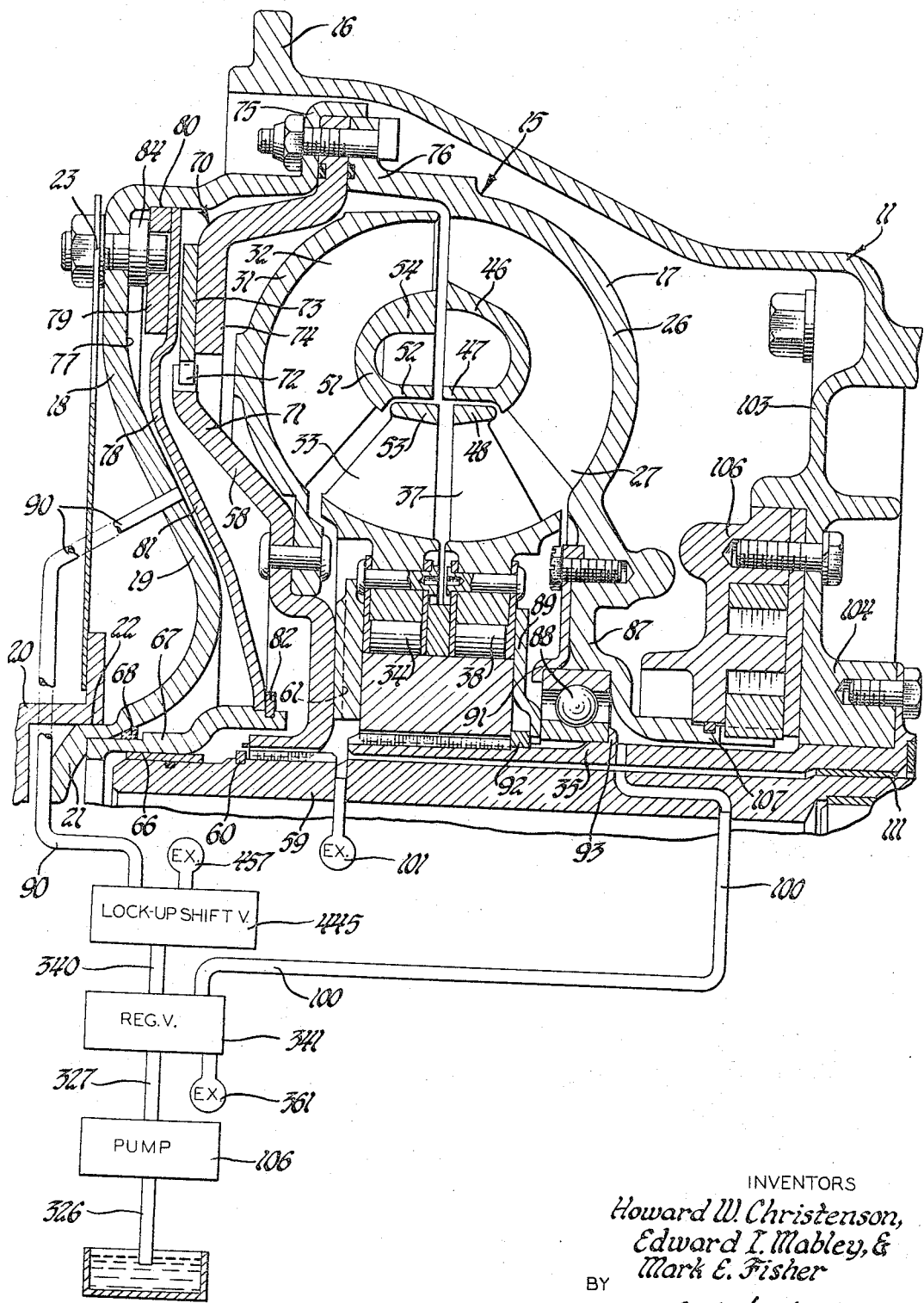

3,338,358
TORQUE CONVERTOR WITH FLUID OPERATED LOCK-UP CLUTCH
Howard W. Christenson, Indianapolis, Ind., Edward T. Mabley, Bloomfield Hills, Mich., and Mark E. Fisher, Carmel, Ind., assignors to General Motors Corporation, Detroit, Mich., a corporation of Delaware
Original application Dec. 22, 1955, Ser. No. 554,866, now Patent No. 3,255,642. Divided and this application Oct. 4, 1965, Ser. No. 492,481
12 Claims. (Cl. 192—3.3)

This invention relates to transmission and particularly to a torque converter and lockup clutch and controls therefor and is a division of applicants' application Ser. No. 554,866, filed Dec. 22, 1955 and now Patent No. 3,255,642.

The transmission employing a torque converter, a lockup clutch and change ratio gear transmission provides a wide range of torque multiplication particularly adapted for use on heavy trucks. The engine driven transmission input member is connected alternatively through either a hydrokinetic torque converter to provide torque multiplication or through a lockup clutch to provide direct drive to the transmission change speed gearing which may be of the type shown in the above patent. The torque converter has a rotary housing driven by the engine and driving the torque converter pump to circulate fluid in the torus chamber formed by the bladed pump, turbine and stator elements to hydrokinetically drive the turbine. The lockup clutch is located in the forward portion of this housing and has a flexible annular piston member fixed and sealed at its inner diameter to a hub fixed to the front wall of the housing and movably sealed at its outer diameter to a cylindrical wall portion of the housing. On the supply of fluid under pressure to the chamber between the front wall and the piston member, the piston moves by flexing to engage a driven plate with a fixed plate secured to the housing. The driven plate then rotates with the housing and drives the turbine or output of the torque converter.

An object of the invention is to provide an improved lockup clutch in a torque converter housing having a flexible disk with the central portion secured to the housing and the outer diameter in movable sealing engagement with the housing and moved by fluid under pressure to engage a driven plate against a fixed plate secured to the housing.

Another object of the invention is to provide a lockup clutch having an annular cylinder and piston assembly including a Belleville spring anchored and sealed to the inner diameter of the cylinder, and carrying adjacent the outer diameter the lockup clutch pressure plate and having a sliding seal with the outer diameter of the cylinder.

These and other objects of the invention will be apparent from the following description and drawings in which:
The figure diagrammatically shows a torque converter and lockup clutch and controls therefor.

The transmission has a power train consisting of a torque converter 15 or a converter lockup or direct drive clutch 70 which alternatively connect the engine to the torque converter output shaft which may drive the gearing, as shown in the above patent.

CONVERTER

The converter portion 11 of the housing encloses the stationary torque converter 15 and is open at the forward end and may be secured by flange 16 to the flywheel housing at the rear of an engine. The converter impeller housing 17 which encloses the converter 15 and lockup clutch 70 has a disk-like forward wall 18 having an annular depression 19 around the centrally located forwardly extending pilot tube 21. The pilot tube 21 has a bearing 22 which fits in a bore at the rear end of an engine shaft 20. The engine shaft is drivingly connected to the rotary impeller housing 17 by an annular flex plate 23 secured to the engine shaft flange and wall 18. The wall 18 has a rearwardly extending portion terminating in flange 75 which is secured to flange 76 of the impeller housing 17.

The rear portion of the impeller housing 17 provides an impeller shell 26 which carries a plurality of blades 27. The impeller drives a turbine 31 which carries a plurality of blades 32. The dual stator consists of a first bladed stator 33 mounted by one-way brake 34 on the ground sleeve 35 and a second bladed stator 37 mounted by oneway brake 38 on the ground sleeve 35. The impeller 26 has an inner shroud 46 having at its lower edge a horizontal extension 47 extending over the shroud 48 of the second stator 37. The turbine 31 has a shroud 51 having at the lower edge a horizontal portion 52 extending over the shroud 53 of the first stator 33. Also, the space between the horizontal portions and the stator shrouds are offset to further reduce leakage out of the converter torus chamber. The shroud 51 has an annular bulbous portion 54 at the upper side to provide removable metal to balance the turbine blading. The turbine 31 is secured to the midportion of disk 58 which is splined to the converter output shaft 59 and axially fixed by split ring 60 and thrust washer 61.

The forward end of the converter output shaft 59 is rotatably mounted in bushing 66 mounted in the support sleeve 67 which is secured by suitable means such as weld 68 within the pilot tube 21 of wall 18. The disk 58 has an outer portion 71 which is connected by spline 72 to the driven disk 73 of the lockup or direct drive clutch 70. The fixed driving plate 74 of the lockup clutch has an outer flange located and bolted between the securing flange 75 of the forward wall 18 and the flange 76 of the impeller shell 26 of the converter impeller housing 17. The wall 18 and support sleeve 67 form the cylinder 77 in which the piston 78 is located. The annular flexible plate or disk type piston 78 has an annular stiffening plate 79 secured to annular spring disk 81 positioned and sealed at its inner diameter on the support 67 by ring 82. The piston portion 79 has recesses for pins 84 on studs 23 which prevent relative rotation of the piston rotary housing 17–18. The outer edge of the piston 78 has a sliding seal with a cooperating surface 80 on wall 18 shaped to contact the piston during movement. Fluid to move the piston 78 to the right to engage the lockup clutch is supplied by lockup clutch line 90 to the cylinder 77. The spring disk 81 and converter pressure release the lockup clutch.

The converter impeller housing 17 has at the inner edge a radial extension providing a bearing support 87 to rotatably mount the housing 17 on thrust bearing 88 which is secured by retainer 91 to support 87 and secured by ring 92 and spacer 89 against a shoulder 93 on ground sleeve 35. Spacer 89 locates the one-way brakes 34 and 38. The converter inlet line 100 is connected through the ground sleeve 35 and delivers oil through the bearing 88 and the space between the second stator 37 and the impeller 27 to the converter chamber. The converter oil flows out through the space between the turbine 31 and the first stator 33 and slots in washer 61 to the outlet line 101. The partition 103 between the torque converter portion 11 and splitter gear portion 12 of the transmission housing has a support ring 104 to which the ground sleeve 35 is secured. The front pump 106 secured to the converter side of the partition 103 is of the internal external gear type and is driven by sleeve 107 formed as an extension of support portion 87 of the impeller 26.

The converter output shaft 59 is supported by a bearing 111 in the ground sleeve 35 and provides an output which may drive the change speed gear unit.

CONTROLS

The hydraulic control and lubrication system for this transmission may include the complete system shown in the applicants' parent Patent No. 3,255,642 but only the essential parts for operating the torque converter and lockup clutch are shown in the drawing in this application. The torque converter 15 and lockup clutch 70 are supplied with oil under pressure by the front pump 106. The front pump 106 draws the fluid such as oil via inlet line 326 from the transmission sump and is connected to deliver oil through the front pump line 327 to the pressure regulator valve 341 which regulates the pressure supplied to main line 340 and the converter inlet line 100 and dumps the excess fluid through exhaust 361. The lockup shift valve 445 selectively connects main line 340 to lockup clutch line 90 which supplies fluid to chamber 77 to move flexible disk 78 against its resilience or spring action and the fluid pressure in the converter operating chamber to engage the lockup clutch 70 and blocks main line 340 and connects lockup clutch line 90 to exhaust 457 to exhaust chamber 77 so the spring action of disk 77 and the fluid pressure in the operating chamber disengages the clutch. Patent No. 3,255,642 shows a suitable regulator valve 341 and lockup shift valve 445. Converter inlet line 100 supplies fluid to the torque converter operating chamber. The fluid circulates through the operating chamber and out through exhaust 101 which may be connected as shown in Patent No. 3,255,642 to a regulator valve and a cooling system before returning to the sump.

The transmission drive train has a torque converter 15 and a lockup clutch 70 which are used alternatively in the drive which may include transmission gearing. The engine is connected by a conventional flex plate to drive the impeller housing 17 having impeller blades 27 which hydrokinetically drives the turbine 31 having blades 32 and the converter output shaft 59. The stator is the dual type having stator blades 33 and 37 mounted by means of one-way clutches 34 and 38 respectively on ground sleeve 35 provides the reaction for this torque multiplying converter. A converter having a 2.8-to-1 stall ratio is preferred.

The lockup clutch 70 has driving plates 74–79 on the impeller housing 17 and a driven plate 73 connected by disk 58 to converter output shaft 59. When the torque multiplying effect of the torque converter 15 is no longer necessary, the lockup clutch 70 is hydraulically manually or automatically engaged by the motor including cylinder 77 and piston 78 to connect the rotary torque converter 17 to the converter output shaft 59 to provide a direct drive without the slippage and resultant loss of efficiency of a hydrokinetic torque converter. The Belleville spring piston 78 by its spring action and converter chamber pressure retracts the motor and disengages the lockup clutch 70 when pressure in line 90 is released.

The above described preferred embodiments are illustrative of the invention, which may be practiced in several modified forms within the terms of the appended claims.

What is claimed is:

1. In combination, a drive shaft, a housing having thereon a ground sleeve coaxial with said drive shaft, a torque converter having an impeller housing having a front portion drivingly connected to said drive shaft, a rear portion including impeller blades and a central hub rotatably supported on said ground sleeve, said impeller housing providing a chamber adapted to contain liquid under pressure, an output shaft within said ground sleeve, a turbine in said chamber and nonrotatably secured on said output shaft, a stator mounted on said ground sleeve within said chamber, an annular plate connected to said impeller housing and located within said chamber, a hub support secured to said front portion and extending into said chamber, a flexible disk having its central portion fixed and sealed to said hub support and having a peripheral portion extending beyond the radially inner portion of said plate, said impeller housing having thereon an axially extending surface of revolution adapted to be engaged by the radially outermost portion of said disk during axial movement, said disk and impeller housing cooperating to form a control chamber adapted to contain liquid under pressure, a clutch driven plate non-rotatably secured on said output shaft and having a peripheral portion adapted to be clamped between said disk and said plate, and a passage through which liquid under pressure may be supplied to and released from said control chamber.

2. In a hydraulically operated clutch, in combination, a housing adapted to be secured on a driving member and having a wall and an axially extending surface of revolution spaced from the axis of said member, an annular fixed plate secured to said housing and extending radially inwardly beyond said surface, said housing having a central hub projecting from said wall, a flexible disk mounted on said hub and having a movable peripheral portion contacting said surface for movement across said surface in sealing engagement therewith, said disk, wall and surface cooperating to form a control chamber to contain fluid under pressure, means connected to said hub to secure the central portion of said disk to said hub and permitting axial movement of the outer portion of said disk due to flexing, a driven plate having its peripheral portion disposed between said fixed plate and said disk, said driven plate being adapted to be secured on a driven shaft, and means for supplying fluid under pressure to said control chamber to flex said disk to engage said driven plate between said disk and said fixed plate and to release the fluid to permit said disk to return to disengaged position.

3. In a hydraulically operated clutch for controlling driving connection between coaxial input and output elements, a member adapted to be secured on an input element and having a wall and an axially extending surface of revolution spaced a substantial distance from the axis of said member, a fixed plate secured to said member and extending radially inwardly beyond said surface, a flexible movable disk having its central portion secured to the central portion of said wall and having a peripheral portion engaging said surface for movement across said surface in sealing engagement therewith, said disk and said member cooperating to form a control chamber adapted to contain fluid under pressure, a driven plate adapted to be secured to said output element and having a peripheral portion disposed between said plate and the peripheral portion of said disk, and means for supplying fluid under pressure to and releasing fluid from said control chamber.

4. A clutch as described in claim 3 in which said movable disk is formed of material the inherent resiliency which causes the peripheral portion of said disk to move away from said plate on the release of fluid under pressure from said control chamber.

5. In a hydraulically operated clutch for controlling driving connection between coaxial input and output shafts, a circular member adapted to have one face secured to an input shaft and having on the other face thereof an axially extending surface of revolution spaced from the axis of said member, a driving plate secured to said circular member radially outwardly of said annular surface and extending radially inwardly of said annular surface, a support hub projecting from said other face of said circular member and having a bore adapted to receive an end of said output shaft, a flexible annular disk having its inner periphery mounted on said hub and having its outer periphery engaging said annular surface for movement across said surface in sealing engagement therewith, means on said hub limiting movement of the central portion of said disk away from said circular member to prevent bodily movement of said disk and permit movement of the outer portion due to flexing of said flexible disk, said disk and said circular member cooperating to form a control chamber adapted to contain fluid under pressure, a driven plate mounted on said output shaft and having a peripheral portion disposed between said driving plate and said disk, and means for supplying fluid under pressure to flex said disk to engage said driven plate and for releasing fluid from said control chamber to permit said disk to return to release said driven plate.

6. In a hydraulically operated clutch, an input shaft, an output shaft, a member having means on one face secured to said input and having on its other face a hub having a bore receiving an end of said output shaft, said member also having on said other face an axially extending surface of revolution spaced a substantial distance from the axis of said member, an annular driving plate secured to said member and extending radially inwardly of said annular surface, a flexible plate mounted on said hub and having a peripheral portion engaging said annular surface for movement across said surface in sealing engagement therewith, means on said hub for limiting movement of the central portion of said flexible plate away from said member, said flexible plate and said member cooperating to form a control chamber adapted to contain fluid under pressure, a driven plate mounted on said output shaft and having a peripheral portion disposed between said driving plate and the peripheral portion of said flexible plate, and means for supplying fluid under pressure to flex said flexible plate to engage said driven plate between said flexible plate and said driving plate to engage said clutch and for releasing fluid under pressure from said control chamber to permit said flexible plate to return to release said driven plate to disengage said clutch.

7. In combination, a driving shaft, a driven shaft axially aligned with said driving shaft, a rotatable fluid operated power transmitting device including a casing driving the impeller and enclosing the impeller and turbine elements, a flexible member drivingly connecting said driving shaft to said casing, means drivingly connecting said turbine element to said driven shaft, a relatively fixed support surrounding said driven shaft, a first bearing means rotatably supporting on said fixed support the portion of said casing remote from said driving shaft and anchoring said casing portion against axial movement, a second bearing supporting the portion of the casing adjacent said driving shaft relative to the driving shaft, said second bearing providing for relative axial movement between the associated casing portion and said driving shaft, the wall of said casing adjacent said driving shaft having on the inner face thereof an axially extending surface of revolution, an annular driving plate secured to said casing and extending radially inwardly beyond said annular surface, a flexible movable plate mounted within said casing and having its peripheral portion in sliding sealing engagement with said surface, means to limit movement of the central portion of said flexible plate away from the casing portion adjacent said driving shaft, said flexible plate and said casing portion cooperating to form therebetween a control chamber adapted to contain fluid under pressure, a driven plate drivingly secured on said output shaft and having a peripheral portion disposed between said flexible plate and said driving plate, and means for supplying fluid under pressure to and for releasing fluid from said control chamber.

8. In combination, a driving shaft, a driven shaft axially aligned with said driving shaft, a rotatable fluid operated power transmitting device including a casing and enclosed fluid circulating impeller and turbine elements, a flexible member drivingly connecting said driving shaft to the casing of said power transmitting device and to the impeller unit, means drivingly connecting the turbine element of said power transmitting device and said driven shaft, a relatively fixed support surrounding said driven shaft, a first bearing means rotatably supporting on said fixed support the portion of said casing remote from said driving shaft and anchoring said casing portion against axial movement, the portion of said casing adjacent said driving shaft having thereon a centrally disposed outwardly extending projection, a second bearing supporting said projection relative to the driving shaft and providing for relative axial movement therebetween, the portion of said casing adjacent said driving shaft having on the inner face thereof a centrally disposed inwardly extending projection on which is supported an end of said driven shaft and also having radially outwardly of said second projection an axially extending surface of revolution, a driving plate secured to said casing and extending radially inwardly beyond said surface, a flexible movable plate mounted on said inwardly extending projection and having its peripheral portion in sliding sealing engagement with said surface, means on said second projection for limiting movement of the central portion of said flexible plate away from the casing portion to which said second projection is secured, said flexible plate and the casing portion having thereon the annular axially extending surface cooperating to form a control chamber adapted to contain fluid under pressure, a driven plate drivingly secured on said output shaft and having a peripheral portion disposed between said driving plate and the peripheral portion of said flexible plate, and means for supplying fluid under pressure to and for releasing fluid under pressure from said control chamber.

9. In a torque transmitting device, a driving shaft, a driven shaft axially aligned with said driving shaft, a rotatable fluid operated power transmitting device including a first casing portion adjacent said driven shaft and a second casing portion remote from said driving shaft, said casing portions cooperating to form a chamber adapted to contain fluid under pressure and enclosing fluid circulating impeller and turbine elements, a fixed support surrounding said output shaft, a first bearing rotatably supporting on said fixed support, said second casing portion and anchoring said casing portion against axial movement, a flexible member drivingly connecting the driving shaft to one of said casing portions and said impeller element, means drivingly connecting the turbine element of said power transmitting device and said driven shaft, a second bearing supporting said first casing portion relative to said driving shaft and providing for relative axial movement therebetween, the inner face of said first casing portion having thereon an axially extending surface of revolution, a driving plate secured to said first casing portion radially outwardly of said annular axially extending surface, said driving pressure plate extending radially inwardly of said axially extending surface, a flexible movable plate mounted within said axially extending surface with the periphery of said flexible plate in sliding sealing engagement with said surface, means connecting the central portion of said flexible plate with the central portion of said first casing portion to limit movement of said flexible plate central portion away from said casing portion, said flexible plate and said first casing portion cooperating to form therebetween a control chamber adapted to contain fluid under pressure, a driven plate drivingly secured on said driven shaft and having a peripheral portion disposed between said driving plate and the peripheral portion of said flexible plate, and means for supplying fluid under pressure to and for releasing fluid from said control chamber.

10. A torque transmitting device as described in claim 9 and in which the inherent resiliency of the material of which the flexible plate is formed causes the peripheral portion of the flexible plate to move away from said driving plate when said control chamber is connected to exhaust.

11. In combination, an input shaft, an output shaft, a rotatable housing for a torque converter driven by said input shaft having a front member having a front plate extending across the forward face of the housing and a front drum portion connected to the outer edge of said front plate and a rear member having an apertured rear plate extending across the rear face of the housing and a rear drum portion connected to the outer edge of said rear plate, said front drum having an inner surface of revolution, a fixed annular plate located between said front and rear drums and the assembly secured together to form the torque converter housing, said fixed plate extending into said housing, a converter pump on said rear member, a converter turbine driving said output shaft, a fixed sleeve extending through said apertured rear plate into said rotatable torque converter housing, a stator on said fixed sleeve, a support fixed to said front plate, said output shaft being supported by said support and in said fixed sleeve, a resilient diaphragm having a movable plate portion opposite said fixed plate fixed at the center to said support and having an outer edge engaging said surface for movement across said surface in sealing engagement therewith and normally in disengaged position, means to prevent relative rotation between said diaphragm and said rotatable housing, a driven plate located between said fixed plate and diaphragm and secured to said output shaft, said diaphragm and said front plate of said rotatable housing forming a clutch apply chamber, means to supply fluid under pressure to said clutch apply chamber to resiliently flex said diaphragm to engaged position to engage the driven plate, said diaphragm and said rotatable housing forming a chamber for the torque converter, and means to supply fluid under pressure to said torque converter chamber for said torque converter and to assist return movement of said diaphragm due to its inherent resilience.

12. In combination, an input shaft, an output shaft, a rotatable housing for a torque converter driven by said input shaft having a front plate extending across the forward face of the housing, an apertured rear plate extending across the rear face of the housing, and a drum portion connected to the outer edge of said front and rear plates, said drum having an inner surface of revolution adjacent said front plate, a fixed annular plate secured in said housing, a converter pump on said rotary housing, a converter turbine driving said output shaft, a fixed sleeve extending through said apertured rear plate into said rotatable torque converter housing, a stator on said fixed sleeve, and output shaft being supported in said fixed sleeve, a resilient diaphragm having a plate portion opposite said fixed plate and fixed at the center of said front plate and having an outer edge engaging said surface for movement across said surface in sealing engagement therewith and normally in disengaged position between said front plate and fixed plate, means to prevent relative rotation between said diaphragm and said rotatable housing, a driven plate located between said fixed plate and diaphragm and secured to said output shaft, said diaphragm and said front plate of said rotatable housing forming a clutch apply chamber, means to supply fluid under pressure to said clutch apply chamber to resiliently flex said diaphragm to engaged position to engage the driven plate, said diaphragm and said rotatable housing forming a chamber for the torque converter, and means to supply fluid under pressure to said torque converter chamber for the torque converter and to assist return movement of said diaphragm due to its inherent resilience.

References Cited

UNITED STATES PATENTS

| | | | |
|---|---|---|---|
| 2,623,411 | 12/1952 | Herndon | 192—3.2 X |
| 2,652,913 | 9/1953 | Schou | 192—87 |
| 2,726,557 | 12/1955 | Ackerman | 192—3.2 X |
| 2,781,858 | 2/1957 | Kelly et al. | 192—3.2 X |
| 2,929,270 | 3/1960 | Tuck et al. | 192—88 X |

BENJAMIN W. WYCHE III, *Primary Examiner.*